UNITED STATES PATENT OFFICE.

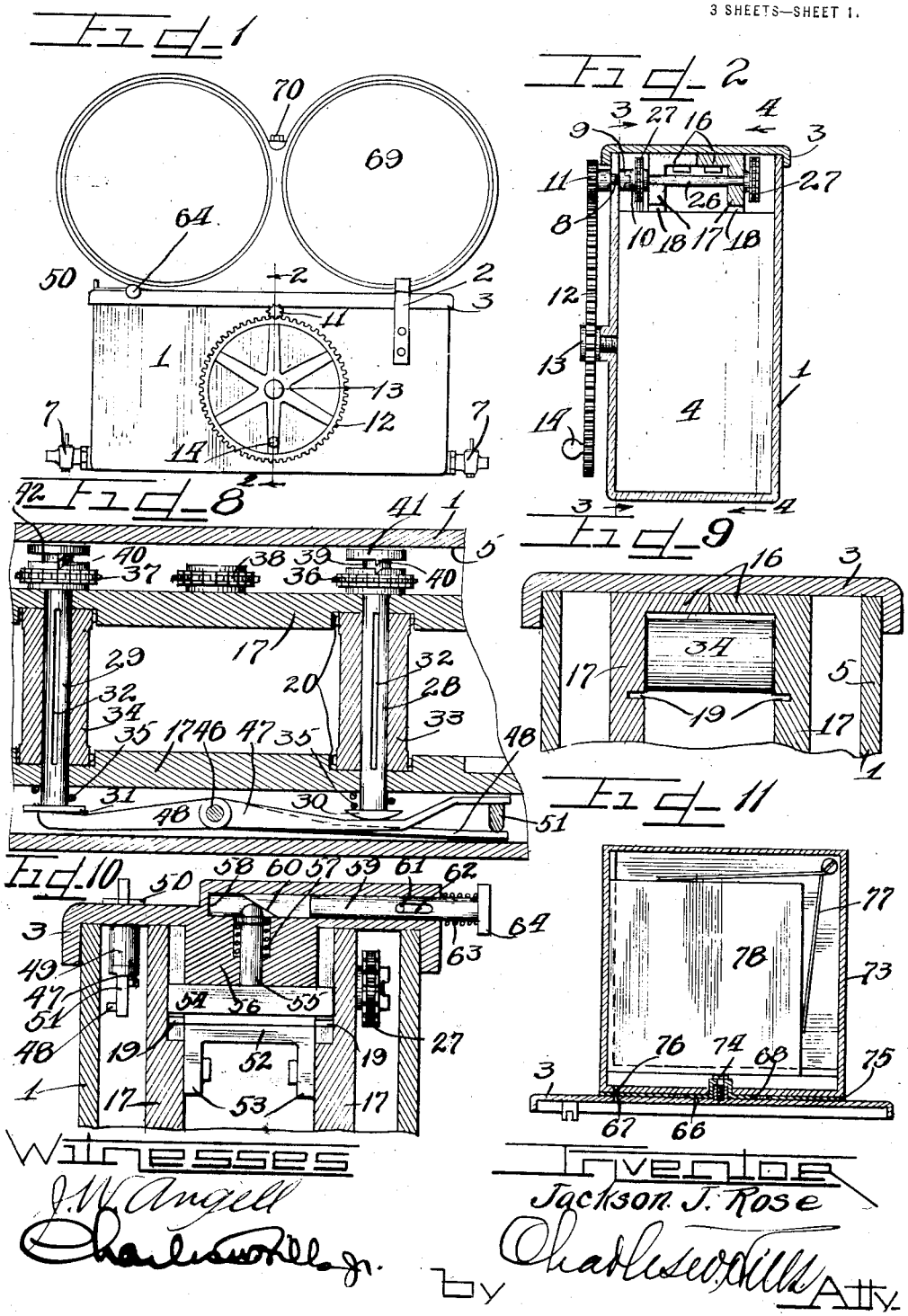

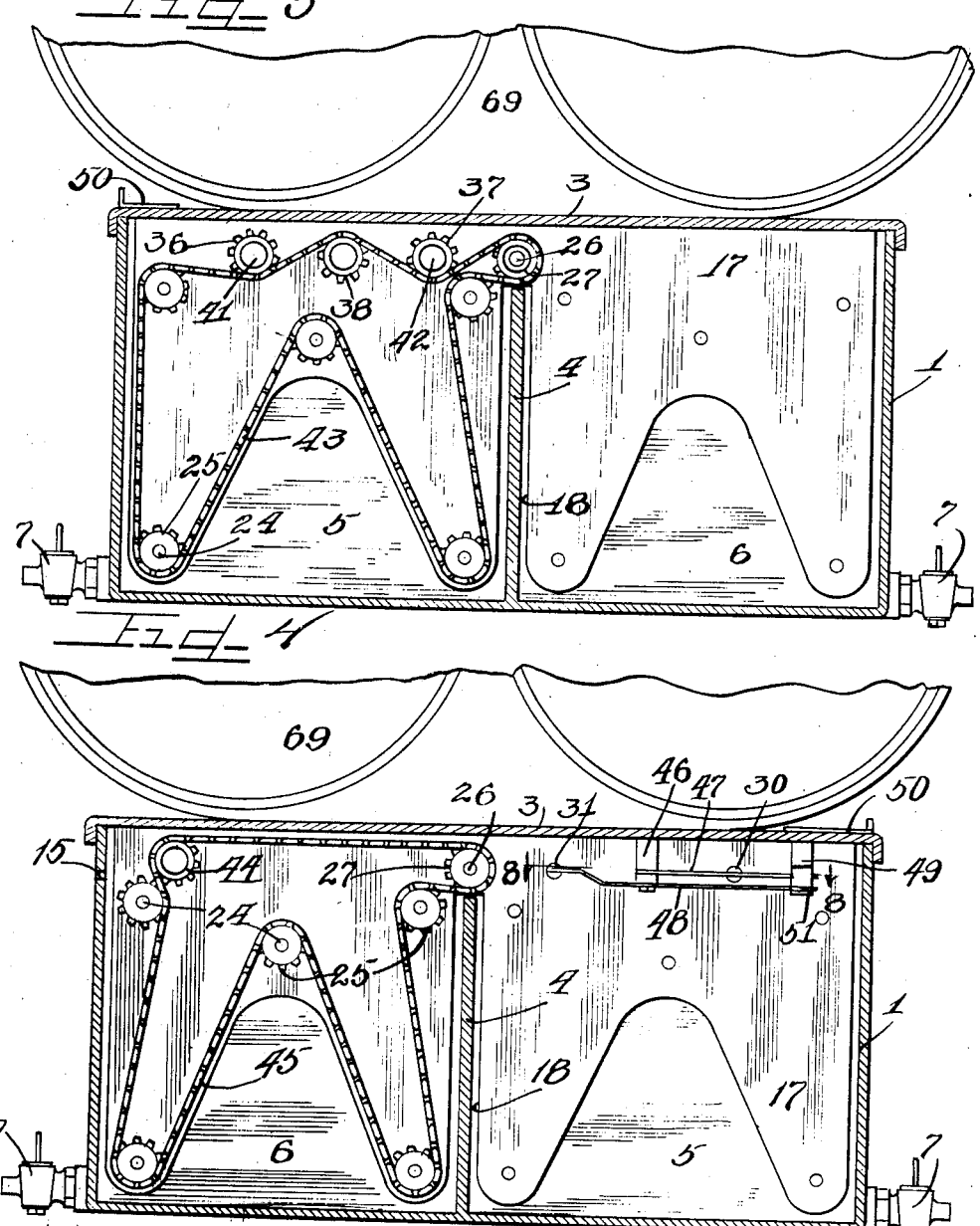

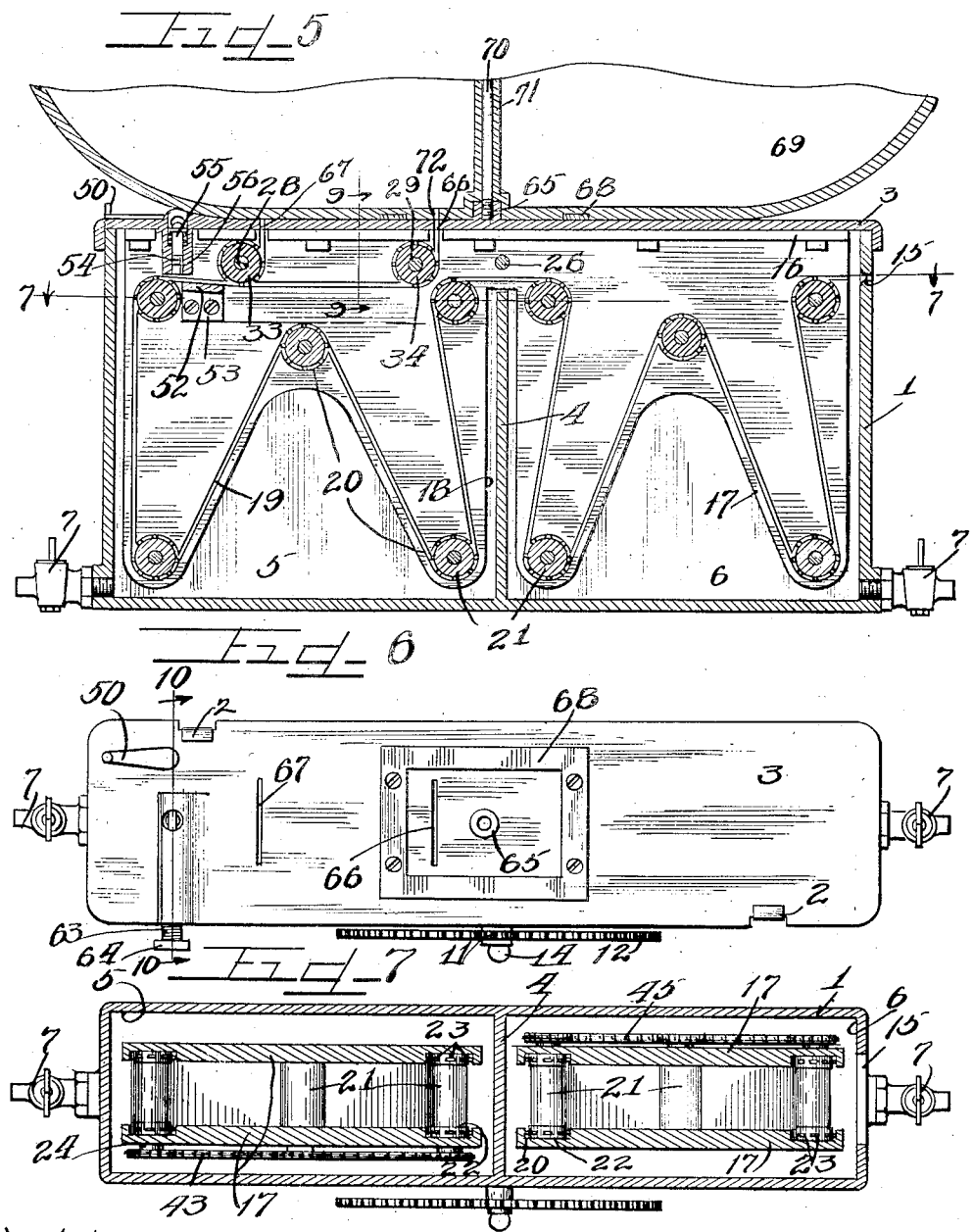

JACKSON J. ROSE, OF CHICAGO, ILLINOIS.

FILM-TESTER.

1,364,321.  Specification of Letters Patent.  Patented Jan. 4, 1921.

Application filed May 28, 1919. Serial No. 300,488.

*To all whom it may concern:*

Be it known that I, JACKSON J. ROSE, a citizen of the United States, and a resident of the city of Chicago, in the county of Cook and State of Illinois, have invented certain new and useful Improvements in Film-Testers; and I do hereby declare that the following is a full, clear, and exact description of the same, reference being had to the accompanying drawings, and to the numerals of reference marked thereon, which form a part of this specification.

This invention pertains more particularly to an improved type of a motion picture film tester adapted to be conveniently used when pictures are taken away from the studios, and permits sample lengths of exposed films to be cut from the end of a film reel, and be automatically fed through developing and fixing solutions and discharged from the tester in developed form so that it may be ascertained whether or not the exposed films in the magazines are satisafactory before the actors are permitted to leave the place and before the equipment is returned.

It is an object of this invenion to provide an improved picture film tester constructed to first cut a short length of exposed film from a reel, and then feed the test length through the tester to develop the test length.

Another object of the invention is the construction of a film tester adapted to removably receive a motion picture film magazine mounted thereon for the purpose of permitting a very short length of the exposed film to be developed with a minimum waste of the exposed film.

It is also an object of this invention to provide a motion picture film tester having a removable cover provided with a feeding mechanism adapted to feed and guide a cut test length of an exposed film through the tester.

A further object of this invention is the construction of a motion picture film tester having an externally operated cutter mechanism mounted therein to permit a short length of an exposed film to be first cut from an exposed film reel and then be guided and fed through different compartments in the tester to develop the test film length.

It is furthermore an object of the invention to provide a motion picture film tester wherein a chambered developing and fixing tank is provided with an externally operable feed and guide mechanism mounted on a removable cover and adapted to feed a short test length of exposed film through the tank chambers to develop the test length of film after it has been cut from an exposed reel of film carried in a magazine removably mounted on the cover of the tester.

It is an important object of the invention to provide a simple and effective motion picture film tester adapted to removably receive either a single or a double camera film magazine mounted thereon for the purpose of developing either short or long lengths of the exposed films in said magazine so that a picture may be retaken if necessary before the people and equipment required in the picture leave the place, thereby keeping down the expense of production.

Other and further important objects of this invention will be apparent from the disclosures in the specification and accompanying drawings.

The invention (in a preferred form) is illustrated in the drawings and hereinafter more fully described.

In the drawings:

Figure 1 is a front elevation of a film tester embodying the principles of this invention.

Fig. 2 is an enlarged transverse section taken on the line 2—2, of Fig. 1, with parts shown in elevation.

Fig. 3 is an enlarged section taken on the line 3—3, of Fig. 2, having the double magazine in position.

Fig. 4 is an enlarged section taken on the line 4—4, of Fig. 2.

Fig. 5 is an enlarged vertical longitudinal section taken centrally through the tester and the double magazine.

Fig. 6 is a top plan view of the tester.

Fig. 7 is a section taken on the line 7—7, of Fig. 5, with parts shown in elevation.

Fig. 8 is an enlarged fragmentary detail section, taken on line 8—8 of Fig. 4, showing parts in elevation.

Fig. 9 is a fragmentary detail section taken on the line 9—9, of Fig. 5, with parts omitted.

Fig. 10 is an enlarged fragmentary detail section taken on the line 10—10, of Fig. 6, showing parts in elevation.

Fig. 11 is a vertical section through single magazine mounted in position on the cover of the tester.

As shown on the drawings:

The reference numeral 1, indicates a container, casing or tank open at the top and provided with upwardly projecting spring clasps or clamps 2, on opposite sides thereof for removably holding a notched top plate or cover 3, seated in position to close the tank. Integrally formed or rigidly secured transversely through the middle portion of the tank 1, is a wall or partition 4, which extends to within a short distance of the top of the tank and divides the same into a developing chamber 5, for holding a developing liquid, and a fixing chamber 6, for holding a solution of sodium thio-sulfate or other fixing solution. An outlet faucet or pet-cock 7, is provided at the lower portion of each end wall of the tank 1, to afford a means for readily draining the compartments or chambers 5 and 6, when it becomes necessary to empty the tank.

A pin or stub shaft 8, is rotatably mounted in the upper central portion of the front wall of the tank 1, and formed on the inner end of said shaft 8, is a head 9, provided with a diametrical lug or rib 10. Secured on the end of said short shaft 8, is a small gear or pinion 11, which meshes with a large gear wheel 12, rotatably mounted on a pin or bolt 13, secured in the front wall of the tank. A knob or handle 14, is secured to the large gear wheel 12, near the periphery thereof to afford a means whereby the gear wheel may be readily turned. A horizontal film outlet slot 15, is provided in the upper portion of the outer end wall of the fixing chamber 6.

Rigidly secured longitudinally across the middle portion of the inner face of the cover 3, are the flanges 16, of two spaced parallel apertured flat frames 17, each provided centrally with a slot 18, open at the lower end to permit the frames when in position within the tank to engage over the partition 4, so that one half of each frame is adapted to fit into the tank chamber 5, and the other half of each frame is positioned within the tank chamber 6, as clearly shown in Fig. 5, so that the lower portions of the frames are surrounded by the developing and fixing solutions in the respective tank chambers 5 and 6. Each of the frames 17, is provided on its inner surface with a continuous zigzag or irregular guide groove 19. At the bights of the groove 19, circular recesses 20, are formed. Rotatably mounted between the frames 17, are a plurality of parallel guide and feed rollers 21, having enlarged heads 22, at each end thereof equipped with teeth 23, disposed radially on the periphery thereof. The heads of the guide rollers are disposed in the circular recesses 20, of the frames 17. The recesses 20 are of the same depth as the frame grooves 19, and communicate with said grooves. Each of the guide rollers 21, is provided with an axial stem 24, at one end.

The guide rollers 21, in the chamber 5, have the stems 24, thereof disposed to project through apertures in the front frame 17, and the stems 24 of the guide rollers in the chambers 6, project through apertures in the rear frame 17. Secured on each of the projecting ends of the roller stems 24, is a sprocket-wheel 25.

As shown in Fig. 2, a shaft 26, is journaled in the frames 17, in alinement with the stub shaft 8. Secured on the projecting ends of the shaft 26, adjacent the outer faces of the frames 17, are driving sprocket-wheels 27. The front driving sprocket-wheel 27, is provided with a diametrically slotted hub for removably receiving the lug 10, formed on the inner end of the stub shaft head 9. Rotatably supported by the frames 17, in the upper portion of the chamber 5, are two spaced parallel shafts 28 and 29, provided with heads 30 and 31 respectively, on the rear projecting ends thereof. The shafts 28 and 29, are slidable transversely of the tank 1, and each is provided with a key 32 which is slidable in a groove formed for the purpose in master guide or feed rollers 33 and 34, respectively. Sprocket teeth are formed peripherally on the enlarged ends or heads of the master guide rollers. A controlling spring 35, is wound around the rear projecting end of each of the shafts 28 and 29, between the rear frame 17, and the respective heads 30 and 31, of said shafts. Loosely mounted on the front projecting ends of the shafts 28 and 29, adjacent the outer face of the front frame 17, are the sprocket-wheels 36 and 37, respectively, which are disposed in the plane of the sprocket-wheels 25, and in the plane of an idler sprocket-wheel 38, rotatably supported on the outer face of the front frame 17. The hubs of each of the loose sprocket-wheels 36 and 37, are each provided with a notch 39, adapted to removably receive a tooth 40, one of which is formed in the inner surface of each of the front heads 41 and 42, respectively formed or secured on the shafts 28 and 29.

An endless driving chain 43, is disposed in the chamber 5, and is trained around the driving sprocket-wheel 27, and engages or meshes with the front sprocket-wheels 25, 36, 37 and 38, as shown in Fig. 3, for the purpose of rotating the various feed rollers 21, 33 and 34, in the chamber 5. An idler sprocket-wheel 44, is rotatably mounted on the rear surface of the rear frame 17, in a plane with the rear sprocket-wheels 25 and 27, in the chamber 6. As shown in Fig. 4, an endless driving chain 45, is trained around the rear driving sprocket-wheel 27, and engages the sprocket-wheels 25 and 44, for the purpose of rotating the guide rollers in the chamber 6.

A mechanism is provided for controlling the operation of the master guide and feed rollers 33 and 34, and as shown in Figs. 4 and 8, said mechanism comprises a post 46, secured at right angles to the inner face of the cover 3, within the chamber 5. Pivotally mounted on said post 46, is one end of an arm or lever 47, positioned to contact the rear head 30, of the shaft 28. Also pivotally mounted on the post 46 below the lever 47, is a fulcrumed lever 48, pivoted intermediate the ends thereof, so that one end is positioned adjacent the inner head 31, of the shaft 29, while the other end of said lever 48, is disposed parallel to the free end of the lever 47, and spaced therefrom. A sleeve 49, is secured at right angles to the inner surface of the cover 3, and projecting through the sleeve and the cover 3, is a rotatable shaft on the upper projecting end of which one end of a handle or arm 50, is secured for rotating the shaft in said sleeve 49. Attached or formed on the lower end of the shaft in the sleeve 49, is a flat sided shoe or pawl 51, disposed between the ends of the levers 47 and 48.

Fig. 10, discloses a film cutting mechanism which embraces a stationary cutter 52, having end arms 53, which are secured to the inner surfaces of the frames 17. A movable cutter 54, is disposed to co-act with the stationary cutter to cut a film passed therebetween. A stem 55, is formed on the top of the movable cutter 54, and projects into a passage provided in an integral projection 56, formed on the inner surface of the cover 3. A spring 57, is wound around the cutter stem 55, and acts to normally hold the movable cutter 54, in an elevated position. A transverse passage 58, is formed in the cover 3, and communicates with the passage in the projection 56, to permit the rounded end of the movable cutter stem 55, to project into the passage 58. The passage 58, opens through the front flange of the cover 3, to permit a plunger rod 59, to be slidably projected thereinto. The inner end of the plunger rod 59, is tapered or chamfered to afford the inclined surface 60, which contacts the end of the stem 55. A pin 61, projects through a slot 62, on the plunger rod 59, to limit the movement of said plunger rod. To hold the plunger rod normally projected, a spring 63, is wound around the projecting end thereof between the front flange of the cover 3 and the head 64 of the plunger rod.

As shown in Fig. 6, the cover 3 is provided with an internally threaded collar or boss 65, at the center of the cover, and with two transverse slots 66 and 67, respectively positioned in that portion of the cover which is disposed above the developing chamber 5. The frame flanges 16, are also provided with openings or slots which register with the cover slots 66 and 67, as shown in Fig. 5.

The guide grooves 19, have the ends thereof disposed to register with the cover inlet slots 66 and 67, and with the outlet slot 15. Secured by screws or other suitable means upon the top of the cover 3, is a rectangular frame 68, which incloses the boss 65, and the film entrance slot 66.

The film tester is adapted to permit a standard double film magazine 69 to be placed upon the cover 3 with the cover frame 68, fitting into a complemental groove provided in the outer surface of the bottom of the double magazine. The magazine 69, is removably held secured in place by a clamping or retaining screw 70, which passes downwardly through a sleeve 71, in the magazine and threads into the cover boss 65. The bottom of the magazine 69, is provided with a film outlet slot 72, which registers with the inlet slot 66, of the cover 3, so that the exposed moving picture ribbon film in the magazine may be threaded from the magazine 69, through the magazine outlet slot 72 and through the cover slot 66, into the tester.

Fig. 11, shows a standard single magazine 73, removably secured on the cover 3, by means of a screw 74, which threads into the cover boss 65. A plate 75, is secured on the bottom of the single magazine 73, and is provided with a groove to fit over the cover frame 68. A film outlet slot 76, is provided in the magazine bottom and in the base plate 75, thereof, and is adapted to register with the tester inlet slot 67, to permit an exposed film in the magazine to be passed into the tester. A spring mechanism 77, is mounted in the single magazine 73, for the purpose of holding a film containing box 78, in proper position.

The operation is as follows:

The film tester is portable and is adapted to be conveniently carried along with the other moving picture camera equipment when pictures are to be taken at considerable distances from the studio. The film tester permits short cut off lengths of the exposed camera film to be automatically fed through the tester on a job to ascertain whether or not the picture taken is satisfactory or must be retaken. The improved film tester affords a means of reducing or keeping down the expense of taking pictures, since the actors and the equipment required for a picture may be held on a particular job for the retaking of a picture in case the first film is unsatisfactory.

When a film has been taken, the double camera film magazine is removed from the camera and is placed on the cover 3. Both the magazine 69 and the frames 17, are secured to the cover 3, and are removable therewith from the tank 1. With the cover removed the end of the exposed film is pulled through the registering slots 72 and 66, and is slidably engaged in the master feed roller 34, the teeth of which are adapted to engage in the marginal apertures of the film. When a double magazine is used the inlet slot 67, is not needed and is closed by the bottom of the magazine, as shown in Fig. 5. In the neutral position of the flat sided shoe 51, the sides of the shoe are contacted and are parallel to the ends of the levers 47 and 48, and thereby permit the springs 35, to pull the slidable shafts 28 and 29, rearwardly whereby the clutch teeth 40 of both of the shaft heads 41 and 42, are moved to engage in the notches 39, of the respective sprocket-wheels 36 and 37. It will thus be seen that in the neutral position of the shoe 51, both of the master rollers 33 and 34, are connected to receive a drive from the chain 43, which engages the sprocket-wheels 36 and 37.

The tank chambers 5 and 6, are provided with the developing and fixing solutions respectively, and the cover 3, is clamped on the tank 1, by means of the clamping members 2. It will be noted that practically all of the operating mechanism of the tester is supported by and removable with the cover 3, with the exception of the driving gears 11 and 12. As already described, the end of the exposed film from the magazine 69, is engaged with the teeth of the master roller 34. The main gear wheel 12, is now rotated by the handle 14, a portion of one revolution only, thereby rotating the gear 11, and the shaft 26, to impart a drive to both of the driving sprocket-wheels 27, and to the chains 43 and 45. Rotation of the chains causes rotation of the feed rollers 21, in both of the chambers 5 and 6. With the rotation of the master rollers 33 and 34, the film is fed along through the guide grooves 19, below the rollers 34 and 33, over the stationary cutter 52, and then over the feed rollers 21, adjacent the stationary cutter, to the second feed roller 21, therebelow.

The development of only a very short length of the exposed film is necessary, and to save as much of the exposed film as possible, the plunger 59, is depressed by pushing inwardly on the plunger head 64, thereby causing the inclined plunger surface 60, to slide on the upper end of the cutter stem 55, to depress the same and move the cutter 54, downwardly to co-act with the stationary cutter 52, to cut the film. The test length of film may of course be as long as desired, but usually a short length sufficient to extend between two of the feed rollers 21, is only necessary. A test length of film having been cut from the main film, the portion of the film between the entrance slot 66 and the cutter mechanism is held stationary by turning the handle 60, to move the shoe 51, into the position shown in Fig. 8, at right angles to the levers 47 and 48, thereby moving the clutch teeth 40, of the shaft heads 41 and 42, out of engagement with the sprocket-wheels 36 and 37. This arrangement prevents rotation of the master rollers 33 and 34.

The large gear 12, is next rotated further to cause a drive to be transmitted to the feed rollers 21, by the chains 43 and 45, in the respective chambers 5 and 6, of the tank 1. The short test lengths of film is thus guided and fed in a zigzag path through the developing solution in the chamber 5, and then over the partition 18, and through the fixing solution in the chamber 6, and out through the discharge slot 15, completely developed. Examination of the test length of film by the operator will tell whether the roll of film which has been taken is satisfactory or not.

After the developing of the short test length of film the magazine 69, may be removed from the cover 3, and the projecting end of the film cut off. By the operation as described, it will be perceived that only a very short length of the exposed film is wasted. The length of film wasted extends from the entrance slot 66 to the second feed roller 21, in the chamber 5, and practically half of said film length is developed for the test. Test lengths of films may be developed at small expense, and after the tester has been used the developing and fixing solutions may be removed from the tank chambers by opening the respective pet-cocks 7.

As clearly shown in Fig. 11, a single film magazine 73, may be used with the tester, in substantially the same manner as that hereinbefore described, with the exception that the entrance slot 67, in the cover 3, is used instead of the slot 66.

I am aware that various details of construction may be varied through a wide range without departing from the principles of this invention, and I therefore do not purpose limiting the patent granted otherwise than necessitated by the prior art.

I claim as my invention:

1. The combination with a film tester, of a variably operable cutter mechanism in the tester for cutting off a short test length of a film, and means for automatically guiding and feeding the short test length of the film through the tester to be developed.

2. The combination with a film tester embracing a two compartment tank, a cover therefor, a variably operable cutter mechanism supported by the cover for cutting off the test length of the film, and means on said cover and projecting into the tank to guide and feed the test length of the film through the tank compartments to develop and fix the test length of the film.

3. The combination with a film tester, of variably operable means therein for cutting off a test length of film.

4. The combination of a film tester, of externally variably operable means therein for cutting off a piece of the film for test purposes.

5. The combination with a film tester, of a removable cover therefor, a cutter mechanism in the tester for cutting off a short test length of a film, and means for guiding and feeding the test length of the film through the tester to be developed.

6. The combination with a film tester, of a removable slotted cover therefor, a cutter mechanism supported by the cover for cutting off a test portion of a length of film run into the tester, means for guiding and feeding the test film portion through the tester for developing said test film portion, and a mechanism adapted to be set for holding the remaining portion of the film in the tester stationary while the cut test portion is being developed.

7. A portable film tester comprising a tank, a removable cover therefor, frames secured to said cover adapted to engage in said tank when the cover is in position, and means rotatably supported between said frames for conducting a film through said tank.

8. A portable film tester comprising a tank, a removable cover therefor, frames secured to said cover having guide grooves therein, and means supported by and between said frames for feeding a film engaged in said grooves through the tank.

9. A portable film tester comprising a tank, a removable cover therefor, grooved frames secured to said cover and projecting into the tank when the cover is in position, feed members rotatably supported by said frames, and means for operating said members for conducting a film slidably engaged in the frame grooves through the tank.

10. A portable film tester comprising a tank, a removable cover therefor, frames secured to the cover and projecting into the tank when the cover is in place, feed rollers supported by said frames, master rollers supported by said frames adapted to feed a film to said feed rollers, a cutter mechanism supported by said cover adapted to cut off the end portion of said film which has passed the master rollers, a mechanism for rotating said master rollers and said feed rollers, and means on said cover adapted to hold said master rollers stationary after the end portion of the film has been cut off to permit the feed rollers to guide and conduct the cut film portion through the tank for development.

11. A portable film tester embracing a tank, a removable cover therefor, frames secured on the bottom of said cover adapted to project into the tank when the cover is in position, rollers supported by said frames for engaging a film, a mechanism for driving said rollers to feed the film through the tank, and means for removing the drive from certain of said rollers after the film to be tested has passed the same.

12. A film tester comprising a tank divided into developing and fixing chambers, a cover closing all of said chambers, parallel frames secured to said cover and projecting into said chambers, said frames having irregular guide grooves on the adjacent faces thereof for receiving the side margins of the test film, and mechanisms supported by said frames adapted to be operated to feed the test film in the circuitous path of said guide grooves and successively through said chambers to first develop and then fix the test film.

13. The combination with a film tester and the feed rollers thereof, of means adapted to be operated to remove the drive from certain of said rollers while the remaining rollers operate to conduct a film through the tester.

14. The combination with a film tester and the feed rollers thereof, means for operating said rollers to feed a film into the tester, a cutter for cutting off a part of the film, and a mechanism adapted to remove the drive from the rollers engaging the main portion of the film to permit the remaining rollers to feed the cut part of the film through the tester.

15. The combination with a film tester, of feed rollers mounted therein, means for operating said rollers, and means for removing the drive from a number of said rollers while the remaining rollers are permitted to continue operating.

In testimony whereof I have hereunto subscribed my name in the presence of two subscribing witnesses.

JACKSON J. ROSE.

Witnesses:
EARL M. HARDINE,
CHARLES W. HILLS, JR.